United States Patent [19]

Blaschek et al.

[11] Patent Number: 5,244,137

[45] Date of Patent: Sep. 14, 1993

[54] FILM TRANSPORT DEVICE WITH SPROCKET TEETH AND FILM PRESSURE SKID

[75] Inventors: Otto Blaschek, Aschheim; Thomas Popp, Munich, both of Fed. Rep. of Germany

[73] Assignee: Arnold & Richter Cine Technik GmbH & Co. Betriebs KG, Munich, Fed. Rep. of Germany

[21] Appl. No.: 585,092

[22] PCT Filed: Mar. 25, 1989

[86] PCT No.: PCT/DE89/00199

§ 371 Date: Nov. 19, 1990

§ 102(e) Date: Nov. 19, 1990

[87] PCT Pub. No.: WO89/09429

PCT Pub. Date: Oct. 5, 1989

[30] Foreign Application Priority Data

Mar. 30, 1988 [DE] Fed. Rep. of Germany ....... 3810813

[51] Int. Cl.$^5$ ............................................. G03B 1/24
[52] U.S. Cl. ......................................... 226/76; 226/82; 226/87
[58] Field of Search .................... 226/76, 77, 82, 87

[56] References Cited

U.S. PATENT DOCUMENTS 4,394,949  7/1983  Gomi ..................... 226/82 X

FOREIGN PATENT DOCUMENTS 7000099  1/1970  Fed. Rep. of Germany .
1597339  10/1975  Fed. Rep. of Germany .
2542013  3/1977  Fed. Rep. of Germany .
2818910  11/1978  Fed. Rep. of Germany .
3810814  4/1989  Fed. Rep. of Germany ........ 226/76

Primary Examiner—Daniel P. Stodola
Assistant Examiner—Paul Bowen
Attorney, Agent, or Firm—Fish & Richardson

[57] ABSTRACT

A film transport device for a film with two uniformly distributed rows of holes. Transport is accomplished with a film transport sprocket with a series of teeth disposed in spaced array along a cylindrical tooth circle, which teeth engage the holes in the film and whose tooth circle is driven by a drive motor. A pressure skid brings the holes in the film into engagement with the teeth of the film transport sprocket. Each sprocket tooth has a root portion that merges with the cylindrical tooth circle structure. A base portion adjacent the root portion directly abuts the root portion and has a film support surface at a height relative to the surface of that tooth circle structure that corresponds to the thickness of the film.

11 Claims, 5 Drawing Sheets

FILM TRANSPORT DEVICE WITH SPROCKET TEETH AND FILM PRESSURE SKID

The invention relates to a file transport device. DE-U-70 00 099 teaches a film transport device with a driven film transport sprocket, each of whose transport teeth has a base with a trapezoidal cross section at its foot end which widens that tooth foot on all sides. The top of the base runs at a distance from and parallel to the surface of the film transport sprocket and serves as a film support so that the film is not supported by the surface of the film transport sprocket, but by the top of the corresponding base. The known film transport device serves to transport both Super-8 film and Standard-8 film using the same film transport sprocket.

A film transport device is known from DE-A1-28 18 910 which has a sprocket connected with the drive shaft of a stepping motor, the teeth of said sprocket engaging the holes in a film for stepwise advancement of the film in a motion-picture camera or in a film projector. The sprocket replaces a claw system used to advance the film, thus reducing the moved masses, increasing the reliability of film transport, and reducing transport noise. In addition, projection at nearly any speed is possible.

A prerequisite for using a sprocket is an intermittently moved drive motor so that the film is correspondingly moved intermittently through the film gate. Stepping motors or DC motors with a corresponding control circuit can be used as drive motors, with the DC motor permanently coupled to an angle indicator disk on which optical, magnetic, or mechanical codes are provided, said codes being scanned by a scanner, said scanner delivering corresponding motor positioning signals to the control device to control the DC motor.

In the known device, the film is guided along a flat contact plate provided with a projection window, located between a light source and projection optics. In addition, an element can be provided which presses the film against the contact plate into the position in which it engages the sprocket. In addition, the known device has the ability to guide the film around the sprocket.

One disadvantage of the known film transport device is that although step control of the drive motor for the sprocket is accomplished with a high degree of precision, a distance must be maintained between the arc of the sprocket and the element pressing the film against the sprocket, so that splices, which are approximately twice the film thickness, can pass through the film transport device without the film being damaged at these points or torn by jamming. Because of the unavoidable play upon engagement of the teeth of the sprocket in the film holes, positioning errors occur both in the direction of movement of the film and also in the plane perpendicular thereto, so that the frames are not located precisely in front of the film gate, resulting unavoidably in blurred projection and changing image position.

The goal of the present invention is to improve a film transport device according to the species in such manner that it reliably transports even thicker film areas with splices or film ends glued on top of one another.

The invention is based on the fact that with a special contour of the film transport sprocket in the area between the root of the tooth and the tooth circle, the film pressure skid that presses the film against the film transport sprocket can be positioned at a minimum distance from the film transport sprocket while maintaining a necessary play between the film transport sprocket and the film pressure skid, so that firstly an exact engagement of the teeth of the film transport sprocket in the film holes is ensured and secondly assurance is provided that even splices can be transported through the gap between the film pressure skid and the film transport sprocket without any risk of jamming or resultant damage to the film holes and/or tearing of the film.

This ensures exact positioning of each frame in front of the film gate in the transport direction and in the film plane, ensuring constantly sharp image projection and accurate frame spacing. In addition, the film has only a small area in contact with the film transport sprocket, so that low stress on the film is exerted even at high transport speeds.

In one advantageous improvement of the invention, the base has a trapezoidal or rectangular profile in cross section, whereby the surface of the film support facing the film on both sides of the tooth root advantageously corresponds to the film thickness.

Another advantageous improvement of the invention is characterized by a recess being provided between the tooth circles of the film transport sprocket, into which recess a film guide plate pressing the film against the film channel wall containing the film gate engages. Preferably, the film guide plate is designed as an extension of a movable film stage, in which a pressure plate pressing the film against the film channel wall is spring-mounted.

In another advantageous embodiment, the film guide plate has at its end projecting into the recess of the film transport sprocket, a rounded part corresponding to the radius of the film transport sprocket.

This improvement on the solution according to the invention ensures that the film is precisely guided in the vicinity of the film transport sprocket and kinking, especially of a film with a splice, is avoided during deflection in the vicinity of the film transport sprocket. By means of the film guide plate engaging the recess in the film transport sprocket, the film is guided between the film transport sprocket and the film pressure skid and even when speed is changed or the film is exposed to varying stress, there is no fear of kinking at this delicate point in the film channel.

Advantageous improvements of the invention are described below in greater detail together with the description of the preferred embodiment of the invention with reference to the figures.

Figure 1:
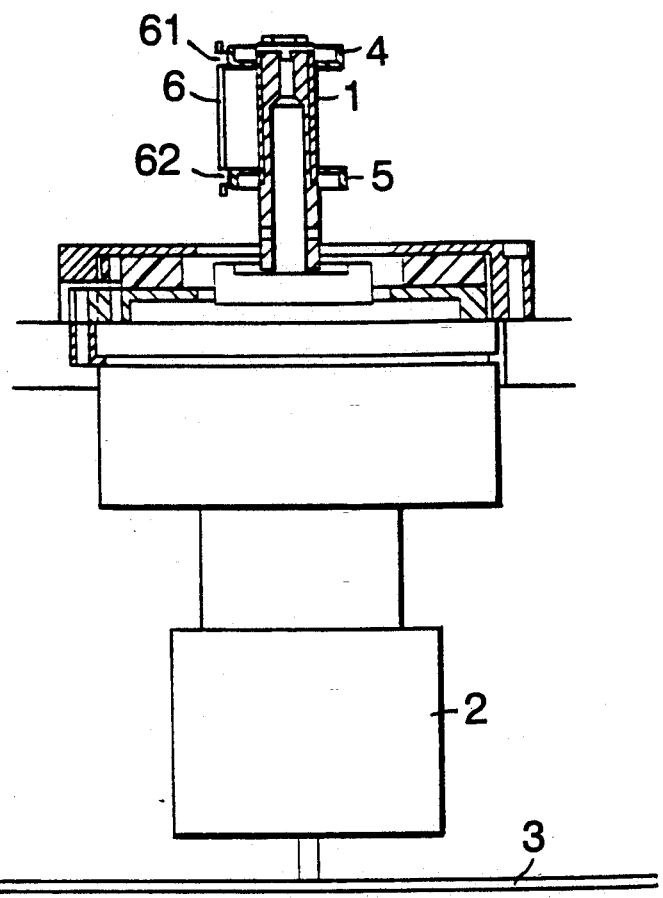
FIG. 1 is a cross section through a film transport device with a film transport sprocket.

The cross section shown in FIG. 1 through a film transport device shows a film transport sprocket 1 with two tooth circles 4, 5, said sprocket being permanently coupled with the shaft of a drive motor 2, on whose shaft an angle indicator disk 3 is also mounted for exact positioning of drive motor 2.

The upper and lower tooth circles 4 and 5 of film transport sprocket 1 engage corresponding rows of holes 61, 62 of a film 6, with engagement being accomplished by a guide, not shown in greater detail, in the form of a film pressure skid or the like. This causes the teeth of film transport sprocket 1 to engage the film holes over a circumferential area of film transport sprocket 1 that depends upon the film path, so that several teeth of each tooth circle 4, 5 of film transport sprocket 1 simultaneously engage corresponding holes constituting the film perforations. Usually, four to six teeth of film transport sprocket 1 simultaneously engage the film holes.

Figure 2:
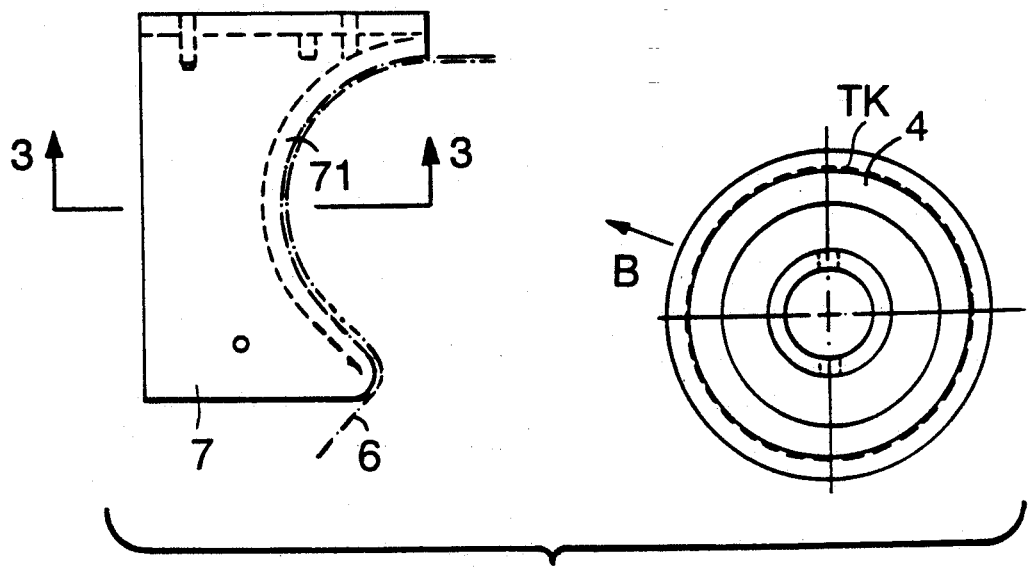
FIG. 2 is a top view of the film transport sprocket with the film pressure skid opposite.

FIG. 2 shows a comparison of film transport sprocket 1 and film pressure skid 7 with film 6 guided between them and represented by dot-dashed lines. This top view clearly shows the guidance of film 6 in an arc around film transport sprocket 1, whereby for improved illustration of the individual parts of the film transport device, film transport sprocket 1 and film pressure skid 7 have been separated from one another. In reality, the teeth of film transport sprocket 1, whose arc is shown by the dot-dashed lines, engage the groove, shown by dashed lines, of film pressure skid 7.

Figure 3:
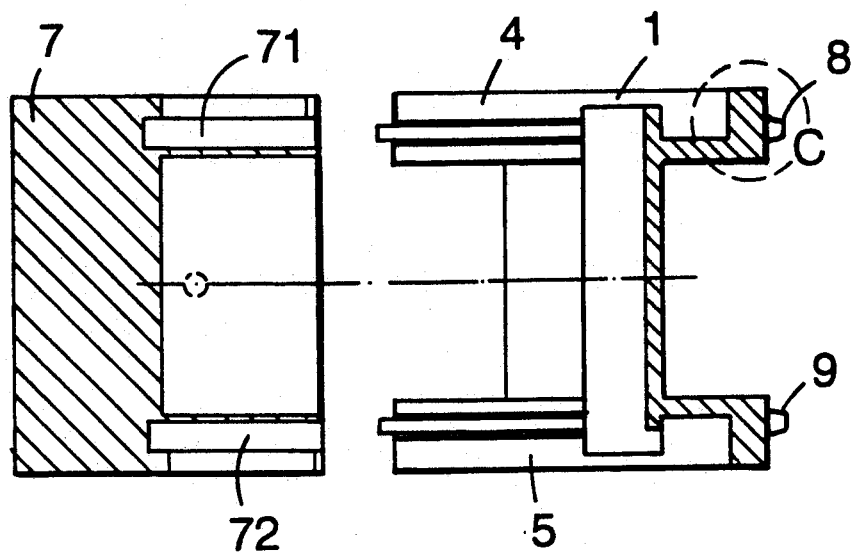
FIG. 3 is a lengthwise section through the film pressure skid and the film sprocket, shown partially in lengthwise section.

The lengthwise section shown in FIG. 3 through film pressure skid 7 along line A—A in FIG. 2 and the partial section through film transport sprocket 1 shows the engagement of the teeth of each tooth circle 4, 5 of film transport sprocket 1 in grooves 71, 72 of film transport sprocket 7.

Figure 4:
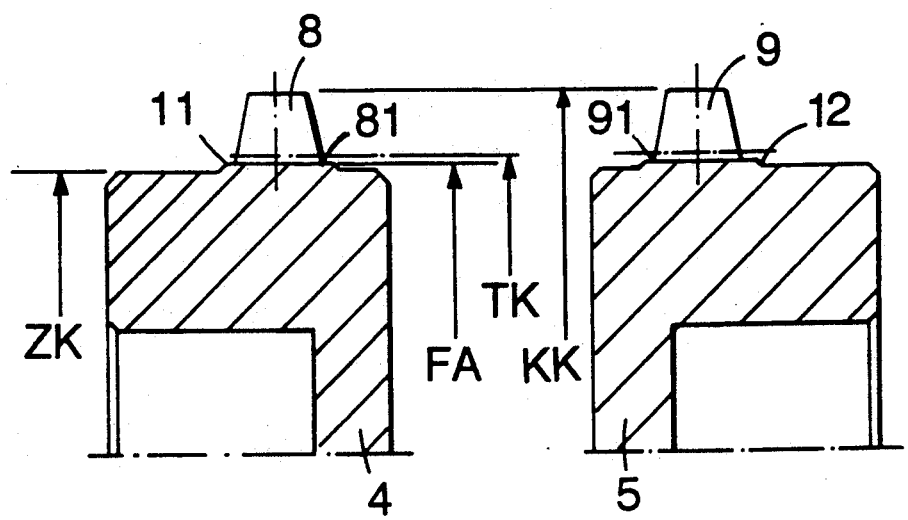
FIG. 4 is an enlarged view of the film transport sprocket.

FIG. 4 shows teeth 8, 9 of tooth circles 4, 5 of film transport sprocket 1. This illustration makes clear that the circumferential surface of the tooth circle with tooth circle diameter ZK has an elevated base 11, 12 whose diameter FA is equal to the root circle diameter of teeth 8, 9.

The arc represented by the dot-dashed lines with arc diameter TK shows the plane of engagement of teeth 8, 9 in the film. Finally, FIG. 4 shows the tip circle diameter KK of teeth 8, 9.

Base 11, 12, has a profile which is trapezoidal in cross section: between tooth roots 81, 91 and the diagonally sloping flank of base 11, 12, a contact surface is provided on both sides of tooth roots 81, 91, on the order of magnitude of the film thickness of 0.15+0.05 mm.

Figure 5A:
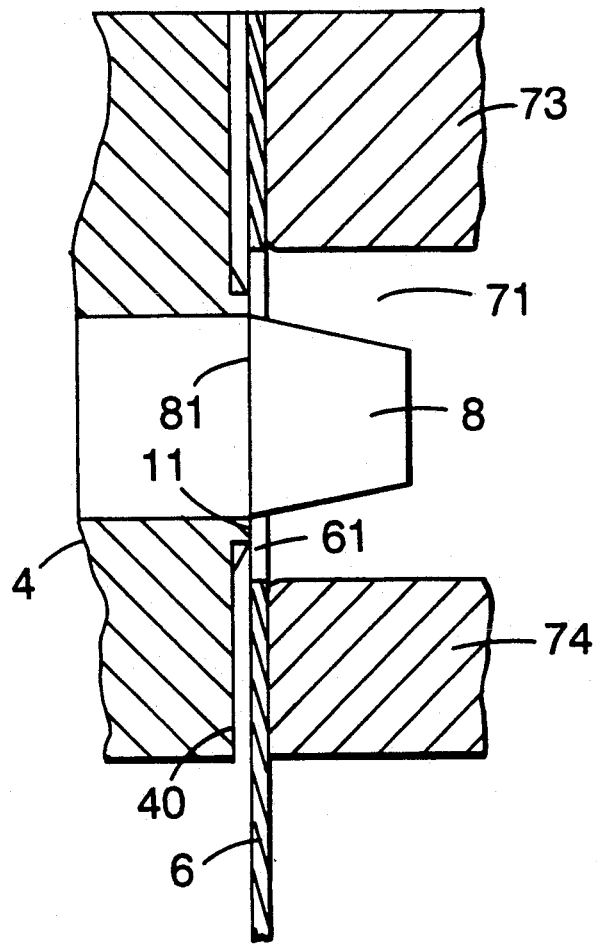
FIGS. 5A and 5B are enlarged views of a tooth in the film transport sprocket and a section of the film pressure skid groove with the film located therebetween.

Alternatively, film support 11, 12 can have a profile which is rectangular in cross section, as shown by the dashed lines in FIG. 5A.

FIG. 5A shows, with further enlargement, through a tooth 8 of film transport sprocket 1, said tooth engaging groove 71 with groove walls 73, 74 of film pressure skid 7, the contour of the film support and the operation of the film transport device when transporting a film 6 as well as a splice 60 in said film.

Between the outer edges of film pressure skid groove walls 73, 74 and circumferential surface 40 of tooth row 4, a space is provided which is approximately twice the thickness of film 6. During normal transport of a single-layer film surface, tooth 8 engages film hole 61 in film 6 in the vicinity of its arc diameter. By the contact against film pressure skid groove walls 73, 74 and support on base 11, the film is guided exactly so that there are no position deviations of the film in the transport and image plane in the vicinity of the film gate.

Figure 5B:
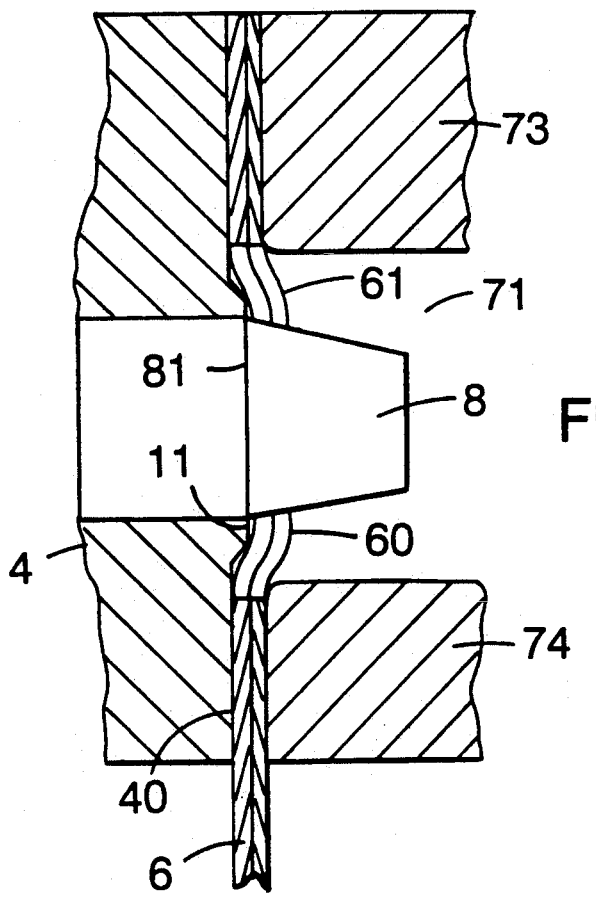

When a second film layer appears, in the case of a splice in film 6, the relationships shown in FIG. 5B obtain.

In this case, as a result of the double film thickness space between the outer surfaces of film pressure skid groove walls 73, 74 and circumferential surface 40, there is sufficient space for transporting film 6. In the vicinity of hole 61 in the film, the film "bends" at splice 60 along the slope of the trapezoidal contour of base 11, without film 6 being damaged or being otherwise adversely affected. In this case also, reliable guidance and hence exact positioning of the frame in question is ensured.

Figure 6:
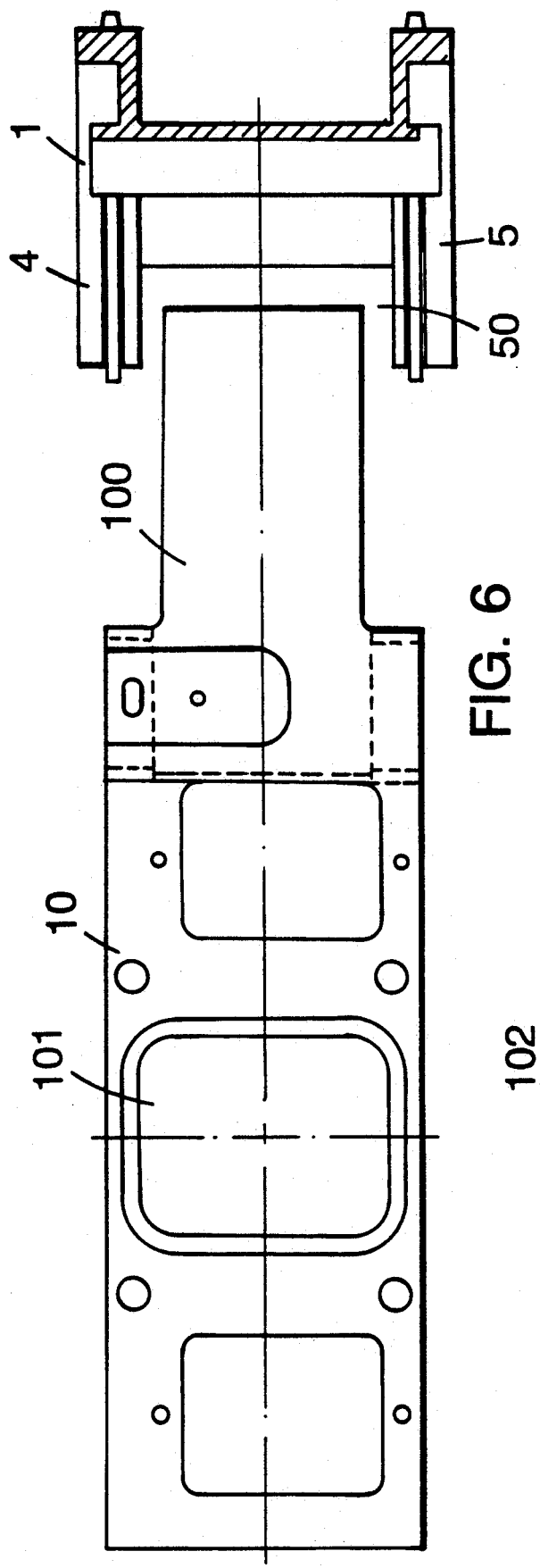
FIG. 6 is a side view of the film stage with the film guide plate and film transport sprocket.

FIG. 6 is a side view of film stage 10 which, when the film channel is in the closed position, presses the film against a film channel wall that contains the film gate for projecting frames.

Figure 7:
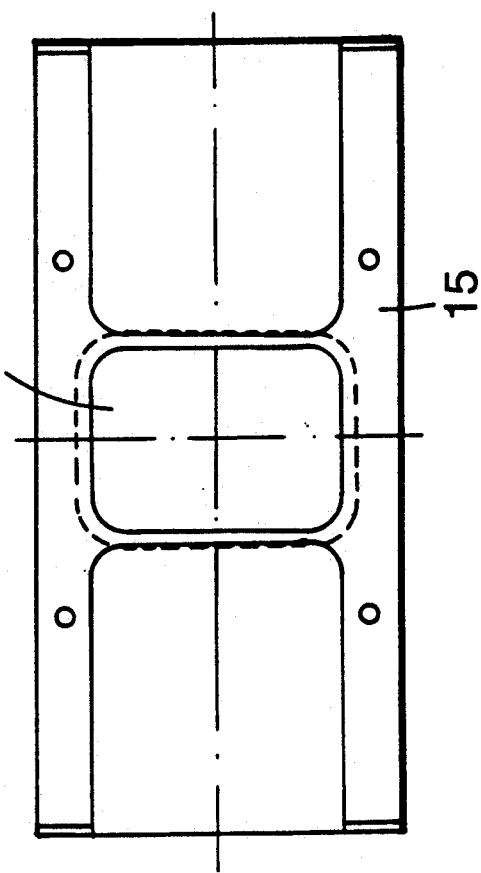
FIG. 7 is a side view of the pressure plate mounted in the film stage.

For this purpose, in the film stage, a pressure plate 15 shown in side view in FIG. 7 is spring-mounted. Film stage 10 and pressure plate 15 have window-shaped openings 101, 102, with window-shaped opening 102 of pressure plate 15 corresponding to the frame format of the film.

On the side of film transport sprocket 1, film stage 10 is provided with a film guide plate 100, which engages a recess 50 between tooth circles 4, 5 of film transport sprocket 1. The nature of the engagement is shown in FIG. 8.

Figure 8:
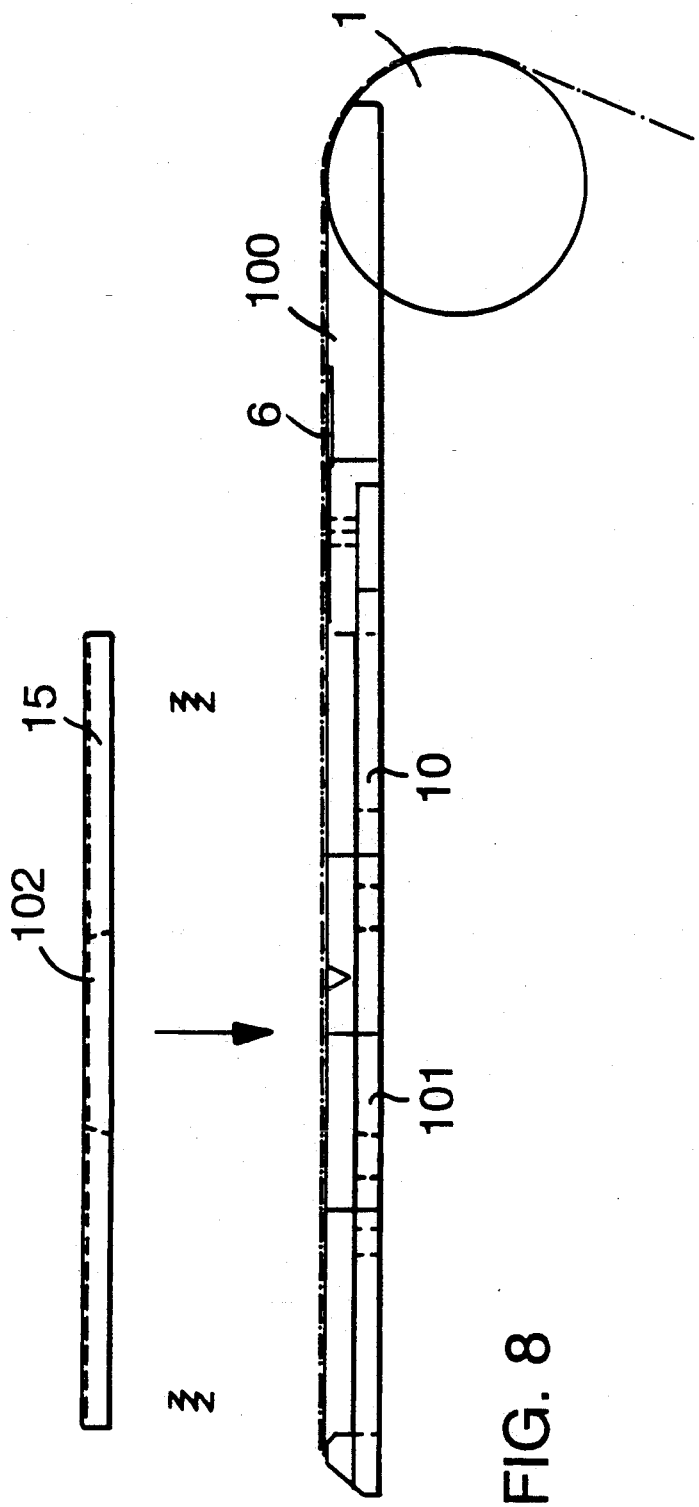
FIG. 8 is a top view of the film stage and the pressure plate as well as the film transport sprocket.

FIG. 8 shows a top view of film stage 10, having a recess 102, in which pressure plate 15 is spring-mounted. Pressure plate 15, when the film channel is in the closed state, forces film 6, represented by the dot-dashed lines, against the film channel wall, not shown in greater detail, whereby, with intermittent transport of the film by means of film transport sprocket 1, one frame located in front of the film gate of the film channel wall is illuminated through openings 101, 102 of the film stage or the pressure plate by a projection bulb.

Film guide plate 100 engages recess 50 between tooth circles 4, 5 of film transport sprocket 1 in such fashion that it matches the radius of film transport sprocket 1 and thus permits continuous deflection of the film between the film plane and the pressure plate, film channel wall, film transport sprocket, and film pressure skid 7.

In this manner, assurance is provided that the film, during intermittent or continuous transport, cannot kink in the deflection area of the film transport sprocket, something which is particularly important for splices, which, with inaccurate guidance and tensioning of the film in the film channel, tend to kink and hence damage the film.

The invention is not limited in its embodiments to the preferred embodiment described above. Rather, a number of variations are possible which utilize the solution shown, even with fundamentally different designs.

We claim:

1. Film transport apparatus for transporting a film having at least one set of uniformly spaced film holes comprising a drive motor, film transport sprocket structure, said sprocket structure including cylindrical tooth circle structure and a series of teeth disposed in spaced array along said cylindrical tooth circle structure for engaging said film holes, each said tooth having a root portion that merges with said cylindrical tooth circle structure, drive shaft structure connecting said sprocket structure with said drive motor for driving said sprocket structure in rotation, pressure skid structure that has an inside surface matching the curvature of said film transport sprocket structure, said skid structure having groove structure in said inside surface for receiving said teeth of said film transport sprocket structure with film running between the circumferential surface of said tooth circle structure of said film transport sprocket and said inside surface, each said tooth of said film transport sprocket structure having a base portion adjacent said root portion of the tooth, each said base portion directly abutting said root portion and having a film support surface generally parallel to the adjacent surface of said tooth circle structure and at a height relative to the surface of said tooth circle structure corresponding to the thickness of said film, and structure for positioning said inside surface of said film pressure skid at a distance equal to the thickness of said film from said support surface and equal to twice the thickness of said film from said surface of said tooth circle structure.

2. The film transport apparatus of claim 1 wherein each said base portion has a profile which is trapezoidal in cross section and extends between said film support surface and the surface of said tooth circle structure.

3. The film transport apparatus of claim 1 wherein the width of said groove structure in said film pressure skid structure corresponds to the width of said holes in said film.

4. The film transport apparatus of claim 1 wherein said film is perforated on both sides, and said sprocket structure includes two series of said teeth that project perpendicularly from said cylindrical tooth circle structure, and structure defining a recess between said two series of teeth that runs around said film transport sprocket structure, and further including a film guide plate member mounted centrally with respect to said recess and extending tangentially with respect to said two series of teeth.

5. The film transport apparatus of claim 4 and further including movable film stage structure, said film guide plate member being an extension of said movable film stage structure, and spring structure adapted to act against said pressure plate structure for pressing film against said film stage structure.

6. The film transport apparatus of claim 5 wherein said film guide plate member has an end portion projecting into said recess of said film transport sprocket structure, said end portion having a curved portion matching the curvature of said cylindrical tooth circle structure of said film transport sprocket structure.

7. The film transport apparatus of claim 6 wherein each said base portion extends between said film support surface and the surface of said tooth circle structure.

8. The film transport apparatus of claim 7 wherein the width of said groove structure in said film pressure skid structure corresponds to the width of said holes in said film.

9. The film transport apparatus of claim 1 wherein each said base portion has a profile which extends between said film support surface and the surface of said tooth circle structure, and the width of said groove structure in said film pressure skid structure corresponds to the width of said holes in said film.

10. The film transport apparatus of claim 9 and further including pressure plate structure and movable film stage structure that includes a film guide plate portion that extends tangentially with respect to said series of teeth, said film guide plate portion being an extension of said movable film stage structure, and spring structure adapted to act against said pressure plate structure for pressing film against said film stage structure.

11. The film transport apparatus of claim 1 wherein each said base portion has a profile which is rectangular in cross section and extends between said film support surface and the surface of said tooth circle structure.

* * * * *